(12) United States Patent
Haynes et al.

(10) Patent No.: US 7,487,465 B2
(45) Date of Patent: Feb. 3, 2009

(54) APPLICATION CLIPPINGS

(75) Inventors: Thomas R. Haynes, Apex, NC (US); Kenneth E. Miller, Raleigh, NC (US); Lucinio Santos-Gomez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/326,896

(22) Filed: Jan. 6, 2006

(65) Prior Publication Data

US 2007/0162865 A1   Jul. 12, 2007

(51) Int. Cl.
*G06F 3/048* (2006.01)

(52) U.S. Cl. ........................ 715/805; 345/629

(58) Field of Classification Search ................. 715/804, 715/805
See application file for complete search history.

(56) References Cited

U.S. PATENT DOCUMENTS

| | | | |
|---|---|---|---|
| 5,233,686 A | | 8/1993 | Rickenbach et al. |
| 5,528,744 A | * | 6/1996 | Vaughton .................. 715/772 |
| 5,754,175 A | * | 5/1998 | Koppolu et al. ............. 715/744 |
| 5,841,434 A | * | 11/1998 | Arda et al. ................. 715/804 |
| 5,977,973 A | * | 11/1999 | Sobeski et al. .............. 715/798 |
| 6,108,714 A | | 8/2000 | Kumagai et al. |
| 6,401,134 B1 | | 6/2002 | Razavi et al. |
| 6,437,803 B1 | * | 8/2002 | Panasyuk et al. ............ 715/733 |
| 6,538,660 B1 | | 3/2003 | Celi, Jr. et al. |
| 6,621,524 B1 | * | 9/2003 | Iijima et al. ................ 348/584 |
| 6,765,592 B1 | | 7/2004 | Pletcher et al. |
| 2001/0031075 A1 | * | 10/2001 | Fujii ......................... 382/125 |
| 2002/0023074 A1 | * | 2/2002 | Miller et al. .................... 707/1 |
| 2004/0004626 A1 | * | 1/2004 | Ida et al. ..................... 345/626 |
| 2005/0114793 A1 | * | 5/2005 | Jung .......................... 715/839 |
| 2006/0066621 A1 | * | 3/2006 | Herceg et al. ................ 345/501 |
| 2006/0161859 A1 | * | 7/2006 | Holecek et al. .............. 715/781 |
| 2007/0101291 A1 | * | 5/2007 | Forstall et al. ............... 715/805 |

* cited by examiner

*Primary Examiner*—Kee M Tung
*Assistant Examiner*—David H Chu
(74) *Attorney, Agent, or Firm*—Martin J. McKinley; Dillon & Yudell LLP

(57) ABSTRACT

A method, apparatus and computer-usable medium for: receiving a user input to activate a clip utility within an open application window; enabling a selection of a particular portion of the open widow using a selection functionality of the clip utility, wherein the particular portion is less than a total area of the application window; and on receipt of a request to clip the selected portion while the portion is still selected, dynamically clipping the particular portion from the remainder of the application window and displaying only the clipped, particular portion of the open window as an separate window clip.

17 Claims, 17 Drawing Sheets

| SWG RTP Communi | 06/14/2004 12:29 PM | 105,549 | Reminder: Culture Conn |
| Aridree Proulx | 06/14/2004 12:05 PM | 73,715 | 🔗 Re: Fw: Icon for Propert |

From: SWG RTP Communications  To: SWG RTP All US 0001,SWG RTP All US 00...
Subject: Reminder: Culture Connection A...  cc:

This document expires on
09/12/2004

- Contemporary – Modern non-modified that do not fit into any class

For employees interested in entering their vehicle, the entry deadline is June 14. To enter and get more details on submitting your vehicle, click on the button to the right or e-mail Tara Olsen. (tolsen@us.ibm.com)

A portion of the B503 lot will be ropped off so that there is no traffic permitted through that area during the day. In addition, Culture Connection team members will be on the lot the entire time, but owners are ultimately responsible for the safety of their vehicles, Registrants

| Market report | Edit □ – ? |
|---|---|
| Quoted at 2:25 PM, EDT on 6 Jul. | |
| Refresh | |

| Symbol | Current | + / - |
|---|---|---|
| IBM | 85.34 | -1.70 |

| Indices | Last |
|---|---|
| DOW JONES | 10,210.13 |
| S&P 500 | 1,114.73 |
| AMEX | 1,253.87 |
| FTSE | 4,370.70 |
| HANG SENG | 12,284.08 |
| NIKKEI | 11,579.97 |
| NASDAQ | 1,962.03 |

View full market report
Go to the scorecard home page

APPLICATION CLIPPINGS

BACKGROUND OF THE INVENTION

The present invention relates in general to the field of computers and similar technologies, and in particular to software utilized in this field.

Most conventional computers utilize some form of graphical user interface (GUI) functionality for displaying applications executing on the computer. The most commonly utilized GUI function is provided by Windows® operating system (OS) distributed by Microsoft Corp.

With conventional Windows® operation, it is common for a user to work with (or alternate between) multiple desktop applications simultaneously. Each opened desktop application is represented by its individual window, which is typically a complete window (GUI) "maximized" to fit the entire viewable area of the display screen. Typically, having multiple desktop applications simultaneously executing (i.e., with opened windows) may result in a large number of window frames cluttering the desktop. Because of the limited real estate available for displaying the open windows, only a single widow is typically displayed at a time. Thus, each new application window is typically opened on top of the previous application windows, with the newest opened window completely (or partially) hiding the window(s) below it. When there are multiple application windows opened or only a small portion of second windows (i.e., those in back or beside the primary window) is typically displayed if the first window does not occupy the entire viewable area. In order to switch among these opened applications, the user then has to peel away layers of windows to find the specific application window, whose content the user desires to view and/or interface with. This process may involve one or more of (a) closing windows, (b) reducing window(s) to an application bar, (c) minimizing to a smaller window, or (d) other known methods.

When a user desires to view content of multiple windows simultaneously, each window is reduced (minimized) so that multiple windows are displayed besides each other. However, with such orientation of multiple windows, the amount of content/information shown within the respective windows is reduced to fit the size of the minimized window, which still includes the window borders, top menu items (affordances), scroll bars, etc. The user is thus only able to view a limited amount of the content and may occasionally not be able to view all of the desired content within the minimized window.

It is also difficult to view desired content within the minimized window when the content is not contiguous within the window. The user then has to scroll up/down and/or across to view other information within the same window. This is an undesirable effect of using a windows-based application to view/interact with content within the larger physical window, when only a small portion/fraction of the window provides the useful content.

SUMMARY OF THE INVENTION

The present invention includes, but is not limited to, a method, apparatus and computer-usable medium for: receiving a user input to activate a clip utility within an open application window; enabling a selection of a particular portion of the open widow using a selection functionality of the clip utility, wherein the particular portion is less than a total area of the application window; and on receipt of a request to clip the selected portion while the portion is still selected, dynamically clipping the particular portion from the remainder of the application window and displaying only the clipped, particular portion of the open window as an separate window clip.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2A illustrates a clipping process on an exemplary application window in accordance with one embodiment of the invention;

FIG. 2B illustrates the clipped window portion from FIG. 2A according to one embodiment of the invention;

FIGS. 4A-C show a flow-chart of steps taken to deploy software capable of executing the steps shown and described in FIGS. 3A-3C;

DETAILED DESCRIPTION OF THE PREFERRED EMBODIMENT

Figure 1:
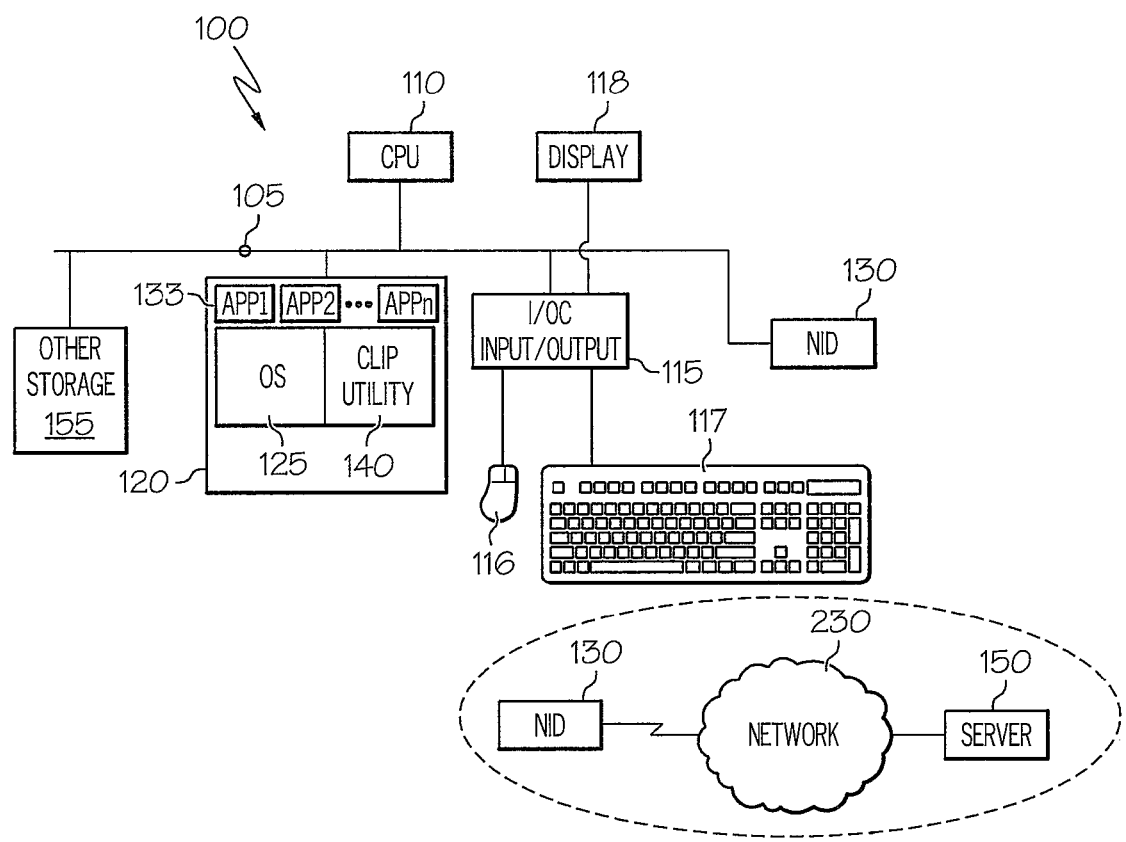
FIG. 1 is a block diagram illustrating an exemplary computer system within which the application clipping features and functions of the invention may be advantageously implemented.

With reference now to the figures, and in particular to FIG. 1, there is depicted a computer system within which features of the invention may advantageously be implemented. Computer system 100 comprises processor 110 coupled to memory 120, input/output (I/O) controller 115, and other/secondary storage 155 via a system bus 105. I/O controller 115 provides the connectivity to and/or control over input/output devices, including mouse 116, keyboard 117 and display device 118.

Computer system 100 also comprises network interface device 130 utilized to connect computer system 100 to another computer system and/or computer network 230 (as illustrated by inset to FIG. 1). NID 130 provides interconnectivity to external network 230 through a gateway or router, or similar device. NID 130 may be an Ethernet card or modem, for example, depending on the type of network (e.g., local area network (LAN) or wide are network (WAN)) to which computer system 100 is connected.

Figure 3A:
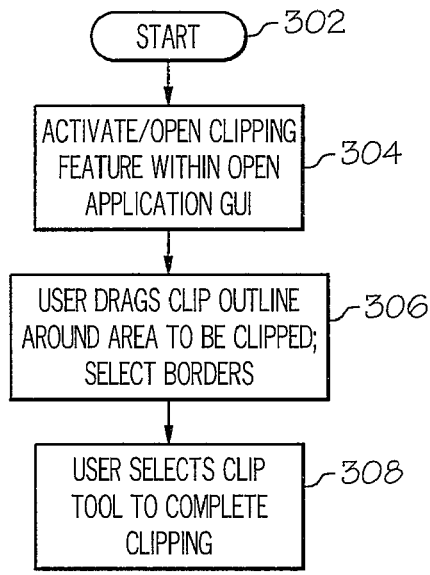
FIGS. 3A-3C are flow charts of the respective processes of clipping within an application window and aggregating (merging) of multiple clip windows into an aggregated clip widow according to one embodiment of the invention.
Figure 3C:
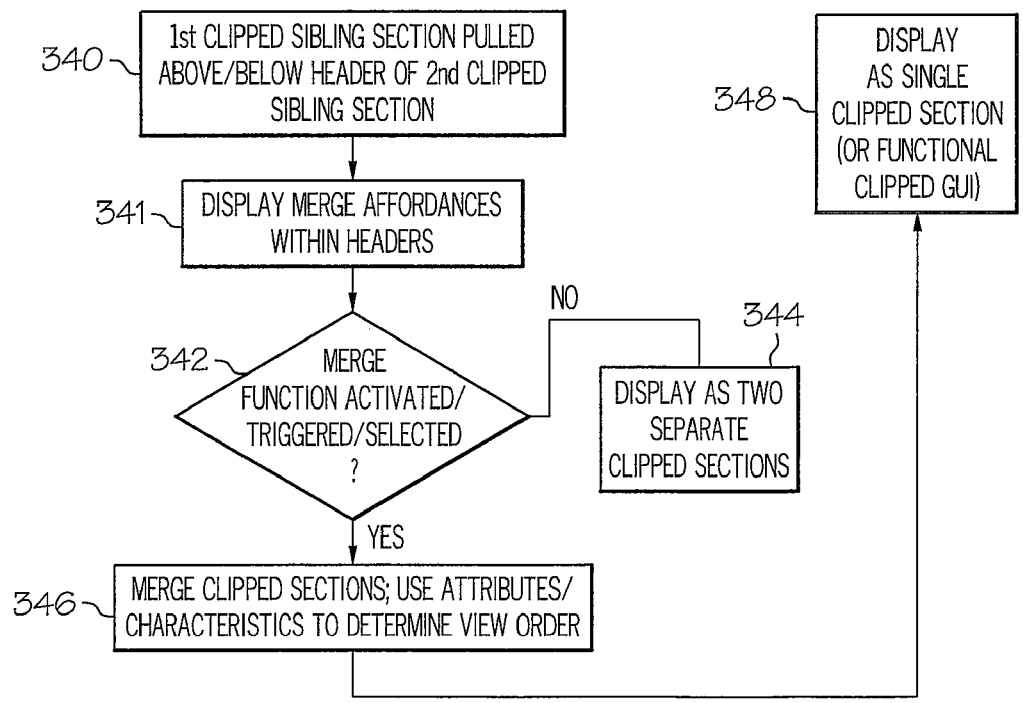
Figure 3B:
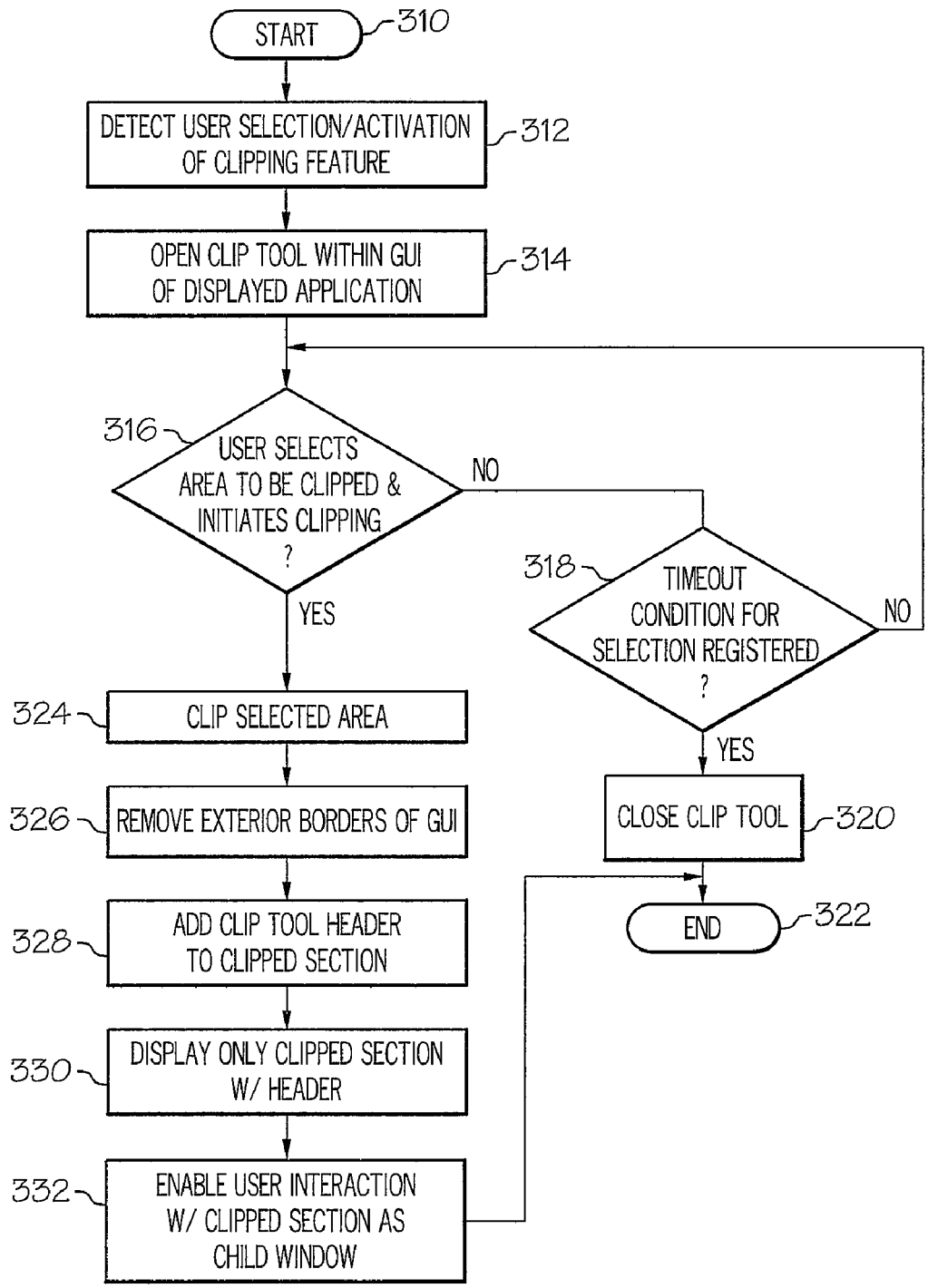

Located within memory 120 and executed on processor 110 are a number of software components, including operating system (OS) 125 and a plurality of software applications, including App1 ... AppN 133 and clip utility 140. Processor 110 executes various application programs (e.g., network connectivity programs, and clip utility 140, among others), as well as the OS (e.g., Microsoft Windows®, a trademark of Microsoft Corp) that supports the application programs. According to the illustrative embodiment, OS 125, one or more of App1 ... AppN 133, and clip utility 140 execute on processor 110 and provide/enable general application clipping functions as well as clip window aggregation features/functionality as illustrated by FIGS. 3A-3C, which are described below.

Notably, while shown as a separate component from OS 125, clip utility 140 may actually be implemented as a subcomponent of OS 125. Thus OS 125 may be enhanced with clip utility functions when installed on the computing device. Additionally, however, clip utility 140 may be an add-on utility that enhances an existing OS 125. In this regard, clip utility 140 may be obtained via off-the-shelf purchase (e.g., on a CD ROM) or downloaded as a separate utility or an upgrade to OS 125 from the OS-developer's support website, for example.

In one embodiment, the hardware components of computer system 100 are of conventional design. Computer system 100 may also include other components (not shown) such as fixed disk drives, removable disk drives, CD and/or DVD drives, audio components, modems, network interface components, and the like. It will therefore be appreciated that the system described herein is illustrative and that variations and modifications are possible. Further, the techniques/functionality for application window clipping and window aggregating may also be implemented in a variety of differently-configured computer systems. Thus, while the invention is describe as being implemented in basic computer system 100, those skilled in the art appreciate that various different configurations of computer systems exist and that the features of the invention are applicable regardless of the actual configuration of the computer system.

Thus, the invention is applicable to not only a desktop-type or laptop computer system but may also be implemented in a portable and/or hand held device such as a personal digital assistant (PDA), cell phone, or other hand-held devices, as well as within larger mainframe type devices so long as the device has a processor and display and executes applications utilizing windowing or similar function enhanced with clipping functions of clip utility 140.

Referring now to FIGS. 2A-2D, there are illustrated in sequence an application window followed by a series of application window clips, which illustrates the process and results of clipping an open application window. The actual processes are provided by FIGS. 3A-3B, which are now described in conjunction with FIGS. 2A-2D. Within the figures, like numerals are provided for like elements within different figures, while new features are provided separate numbers when first illustrated within the figures.

Figure 2A:
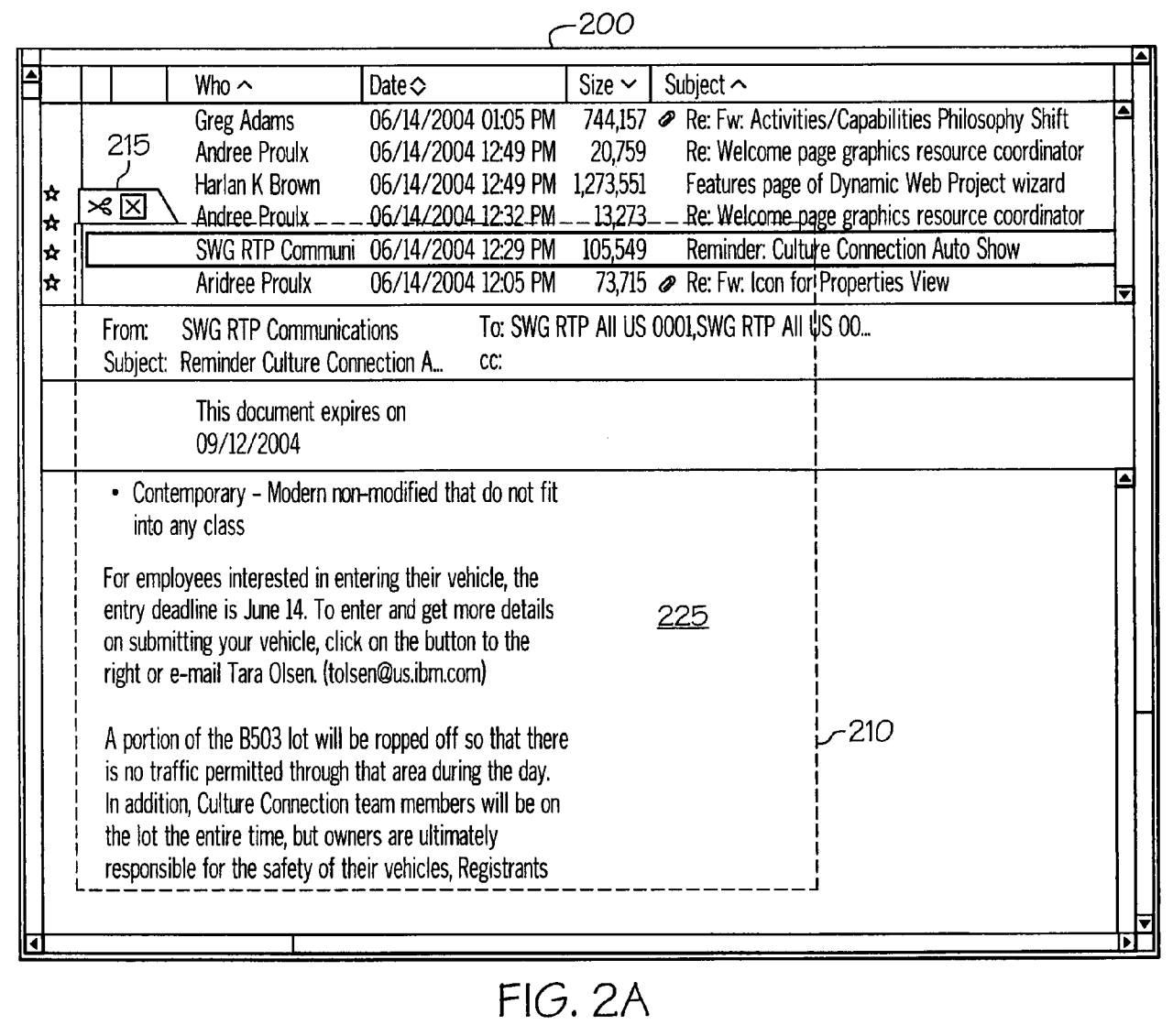

FIGS. 3A (and 2A-2C) illustrates the process by which a user creates application window clippings on a windows-based computer. The process begins at initiation block 302 and proceeds to block 304 at which is depicted the user activating/opening the clip function 215 within opened application window 200 displayed as a graphical user interface (GUI) on display device 118. In one embodiment, the user gets into "clipping" mode by accessing a "mode switch/function" within the window (e.g., a context menu item in the desktop). The mode switch may exist as a pull-down menu item (e.g., "tools") or simply an icon added to the desktop window display via clip utility 140 or OS 125. In another implementation, the mode switch is provided when the user right clicks on a mouse to open the content menu while the pointer is position anywhere within the window 200. As shown in FIG. 2A, the clipping mode includes a dashed outline (referred to herein as the "clip segment" 210) around content 225 that is to be clipped from window 200.

From the regular window frames containing the target application, the user selects the target area that the user wants to subset. This selection may be carried out by direct manipulation (marquee selection) as illustrated by FIG. 2A or by some other method of defining the outline. In one embodiment, a default area of the window is selected as the clip segment 210 and that area may then be adjusted by the user using a pointing device and the drag functionality associated therewith. In another embodiment, the user selects the area by position the mouse pointer (or cursor) over an area of the window before selecting the mode switch. When the mode switch is then selected, the outline automatically provides a clip segment 210 around the mouse pointer indicating that area is to be clipped. The user may then adjust the area by moving the borders of the clip segment 210.

Returning to FIG. 3A, with the clipping mode activated and the outline displayed, the user drags the outline area around the content desired to be clipped (i.e., the user moves the borders of the outline around the content) as shown at block 306. In a third embodiment, the user selects the content by first using the shift/control key and drag option to select the content to be included in the clip segment 210. Following, the user selects/activates the clipping tool affordance (i.e., the scissors at the top of the clip segment) to complete the clipping of the selected content/area (e.g., within 225) from the general application window 200, as illustrated at block 308.

Referring now to FIG. 3B, which illustrates the computer software processing-side of the process of FIG. 3A. The computer software processing begins at initiation block 310 and proceeds to block 312 at which the OS detects a user selection/activation of the clipping mode. The OS initiates execution of the clipping utility, which provides a clip segment around particular content within the GUI of the displayed application, as depicted at block 314. The user selects content and a determination is made block 316 whether the user triggers the start of the clipping operation. If the user has not activated the clipping tool, a check is made at block 318 whether a timeout condition has been triggered since the initial activation of the clipping mode (or last recorded user input).

This timeout condition enables the OS to return to normal view of the application when the user does not complete the segment selection or clipping function within a preset time (e.g., 10 seconds). In one embodiment such time is measured from the last time the user actually moves or manipulates the clip segment (including content therein) in any way, so that the user may reset the timer by simply clicking on or inside of the segment borders, thus enabling a new time period to decide whether to proceed with clipping and/or what portions of the application window to clip.

If the timeout condition is triggered, the utility closes the segment as indicated at block 320 and then the process ends at terminator block 322. Returning to decision block 316, once the user has selected the area and initiated the clipping process, the utility causes the selected area (segment) to be clipped at block 324, and the clip utility removes (or hides from view) the exterior portions of the window outside of the clipped area (segment), as shown at block 326. Then, as shown at block 328, the clip header is added to the segment to enable the clipped window to be so identified and also to be selectively moved or closed via exit affordance 235. Clip utility 140 then enables the display of only the clipped portion of the window (i.e., the window clip) along with the header portion attached thereto, as stated at block 330 and illustrated at FIG. 2B. Finally, the utility enables user interaction or further manipulation of the window clip, as shown at block 332. In one embodiment, the window clip may then be saved by the user as an application clip file. Thus file may then be closed and later retrieved with the assigned name. A default name may be provided that is similar to the application file name but with a different extension (e.g., clp). For example, application file "rose.doc" may provide a window clip that is saved with default name "rose.clp." Also, the window clip may also include editing and configuring icons and selectable menu buttons that enable the manipulation of window clip, somewhat similar to a minimized window.

Figures 2C, 2D:
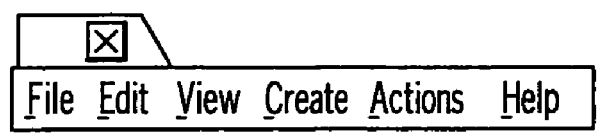
FIGS. 2C-2D illustrates other clipped window portions clipped from different applications or different portions of the application according to various implementations of the invention.

In one embodiment, multiple portions of a single application window may be clipped from the window, either by a single multiple-clip operation or by multiple individual clipping operations. As shown by FIGS. 2B-2D, specific portions (2B, 2D) of the window may be clipped that provides window content, while other portions (2C) may comprise functional elements, such as the selectable menu affordances at the top of standard desktop windows. Notably, in the described embodiment, any functional element clipped from the original window maintains their functional features at least with respect to that application window. Thus, selecting "file" on menu window clip 210 opens the file menu, displaying the various selectable options in a typical file menu of the application's window. Further, if the user then selects the "save as" or "save" function (within the file menu), the content of the entire file opened in the application window and/or the window clip is saved to the computer's storage. Editing within the content of the window clip may also affect the content of the file within the full application window unless the window clip was saved as a separate file.

Figure 2E:
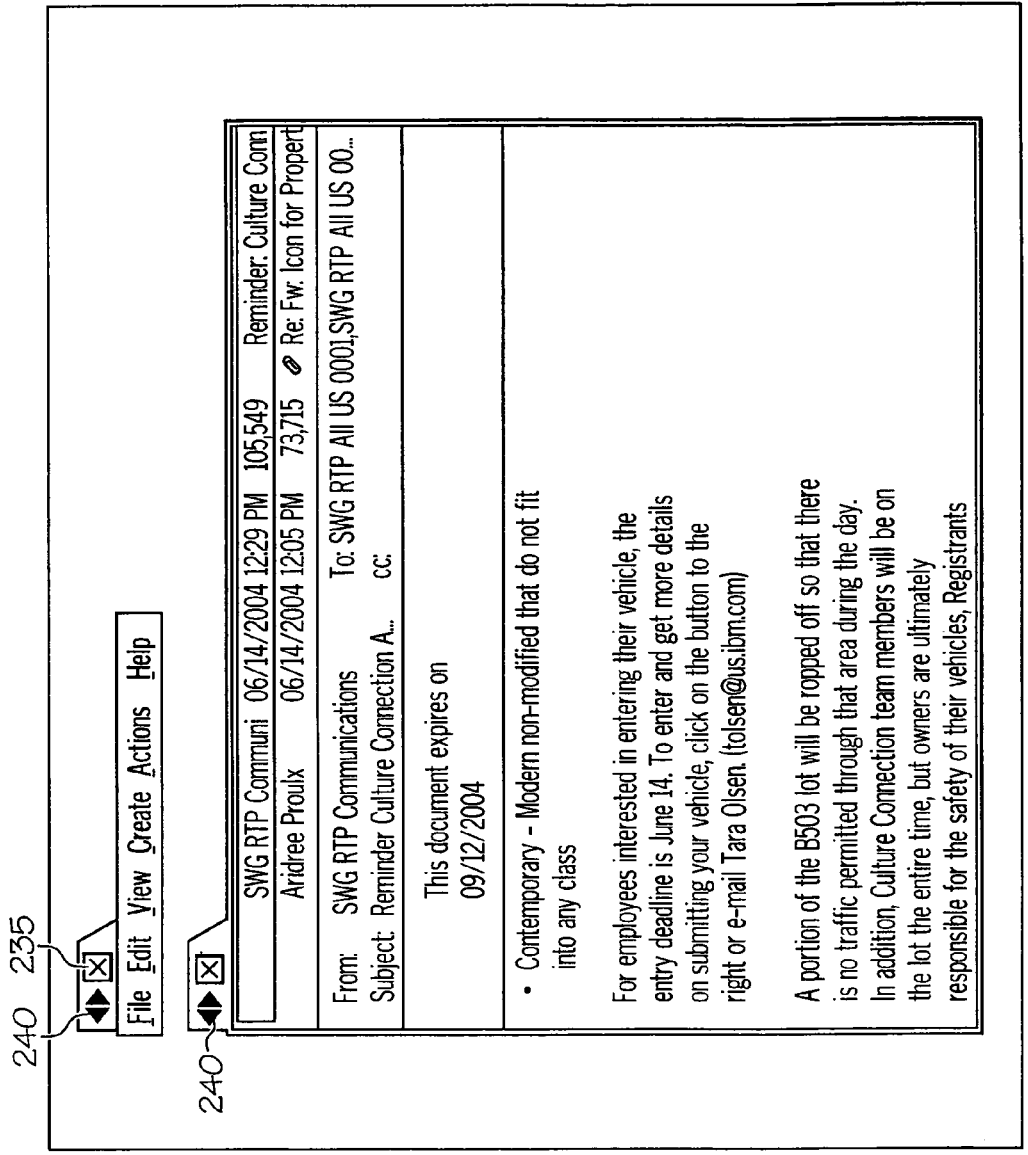
FIG. 2E illustrates two clipped window portions of the same application window, each including an aggregation affordance to enable an aggregation/combining function according to one embodiment of the invention.
Figure 2F:
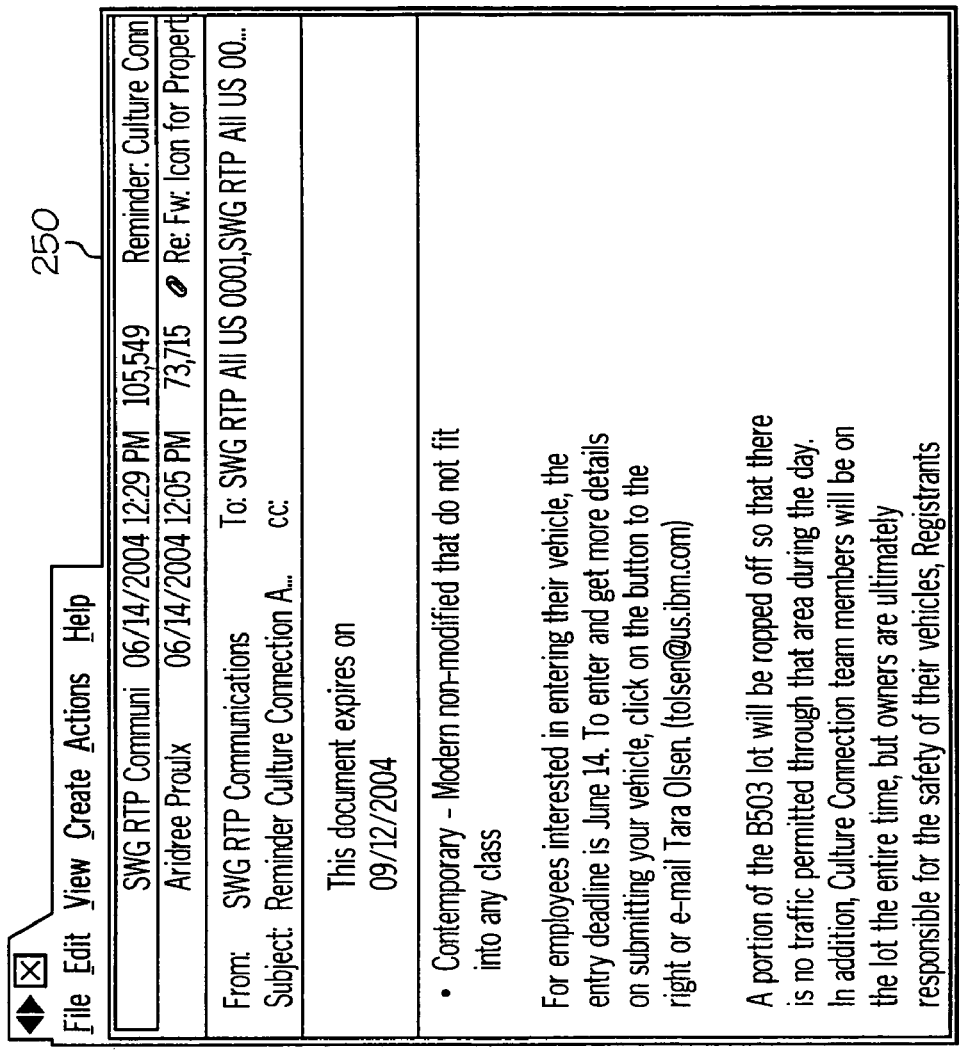
FIG. 2F is a block diagram illustrating the resulting aggregate clip window following the processing of FIG. 3B applied to the clipped window portions of FIG. 2E according to one embodiment of the invention.

Turning now to FIG. 3C and referencing FIGS. 2E-2F, there is illustrated the process related to an additional enhancement provided by the clipping utility of the invention. Two window clips are shown, a first menu window clip 2xy and a second content window clip 2xx. According to the illustration, the two window clips belong to the same parent application window. However, the invention contemplates extension of this aggregation feature to window clips from separate applications. The alternate implementations would then enable user generation of specific aggregated windows that comprise a combination of different window clips (e.g., 2C and 2D) from different application windows.

The process of FIG. 3C begins at block 340 at which the user selects and pulls/drags the first window clip to a position in close vicinity to the second window clip. When this occurs, the window clips each display a merge affordance within their respective headers, as shown at block 341. These affordances indicate to the user that the window clips may be combined (aggregated) with at least one other window clip. In one embodiment, merge affordances are provided (i.e., displayed within the header) whenever there are multiple window clips on the display that may be aggregated together. That is, a single window clip displayed on the display screen appears with a header similar to FIG. 2B, while that same window clip is later displayed with a header similar to FIG. 2E at the time a second window clip is provided that may be linked/aggregated with the window clip.

Clip utility 140 generates the merge affordances and includes with the affordances certain aggregation requirements. For example, the orientation of the particular window clip relative to another window clip may be "programmed" within the affordance so that the resulting aggregate window clip only aggregates in the correct orientation. With the illustrative embodiment, for example, the menu window clip would require placement above the content window clip during aggregation. The utility thus programs the affordance to force any aggregation of the menu window clip placed on top of the content window clip, as shown in FIG. 2F.

Returning now to FIG. 3C, once the window clips are brought within proximity of each other, the utility determines at block 342 if a merge/aggregate function is triggered (or manually selected by the user). In a first embodiment, the merge function is automatically triggered when the two window clips having respective merge affordances are within a pre-set proximity of each other. In another embodiment, the user drags the two windows adjacent to each other and then selects (clicks on) the merge affordance on one of the clipped windows. Alternate embodiments are possible that would enable the user to trigger activation of the aggregation process, and such embodiments fall within the scope of the invention. Additionally, in one embodiment, the merge affordances of clip windows that are not able to be merged signal the user that the clip windows may not be merged by simply not merging or by providing a visual representation that the merge is not supported for those two specific window clips.

When the merge/aggregation function is not triggered, the window clips are displayed as separate adjacent windows (FIG. 2E). However, when the merged function is triggered, the utility merges the clipped sections at block 346 and utilizes defined attributes, characteristics, etc. of each window clip to determine the viewing order or orientation of the individual window clips within the aggregate window. Following, the aggregated window is displayed as a single aggregate window clip 250 as indicted at block 348. According to the illustrative embodiment, as described above, the aggregated window clip 250 includes the menu functionality of a standard (un-clipped) desktop application window with a similar top menu affordance as that illustrated in FIG. 2F.

The present invention enables users to "clip" portions of windows frames, where these application clippings typically display a subset of the functional state displayed by the full application. The clipping capability allows users to save desktop real state by targeting specific function(s) within an application, and consequently allocating only the desktop real state necessary to display that functionality. In one embodiment, the clipped application functions as the standard application within the boundaries and constraints imposed by the clipping boundaries (i.e., the functionality accessible from windows outside the clipping would not be available). However, the various functionality within the clipping as well as those later merged via aggregation are fully available.

Software Deployment

Thus, the method described herein, and in particular as shown and described in FIGS. 3A-3C can be deployed as a process-software from service provider server 150 to client computer 100.

Figure 4A:
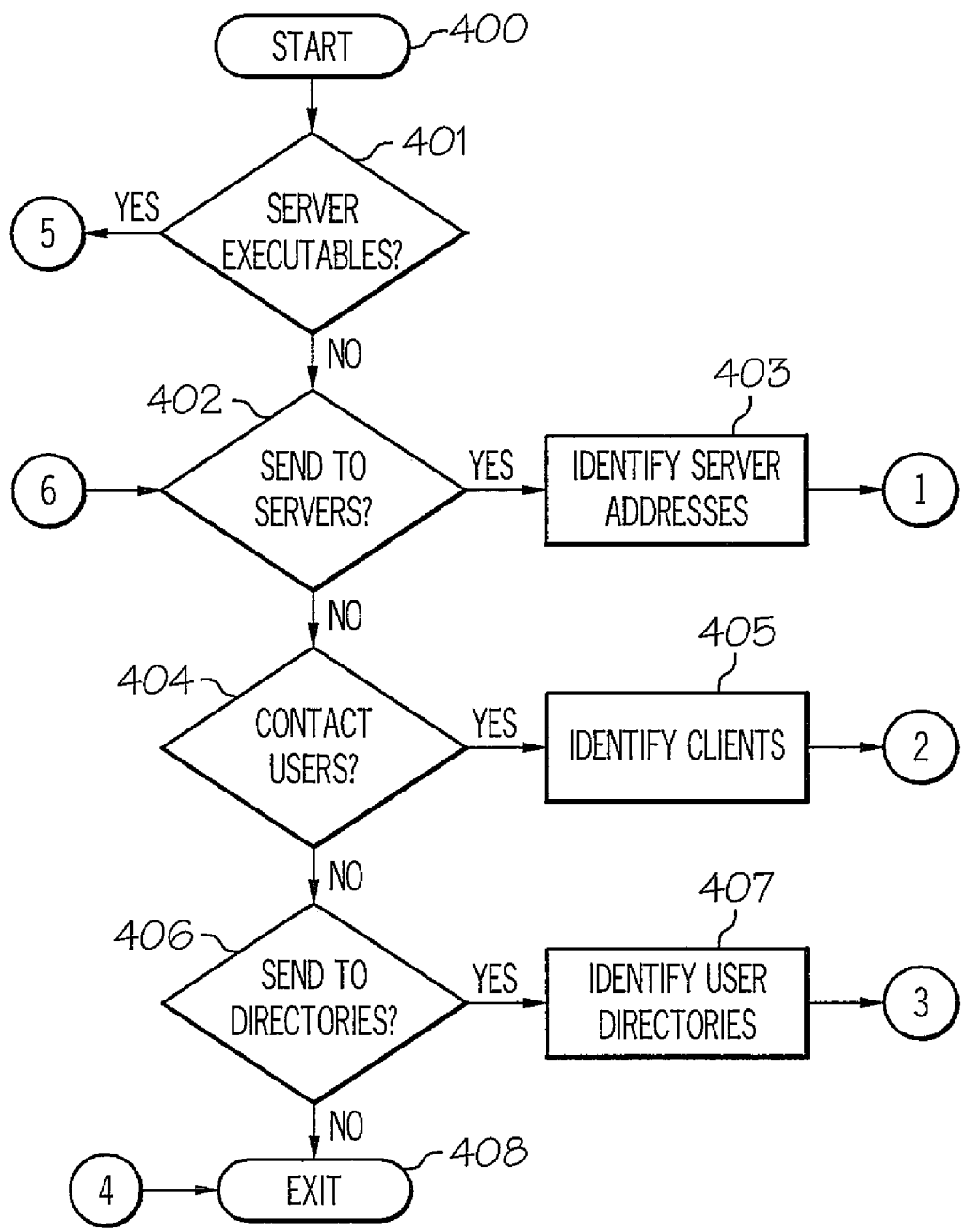
Figure 4B:
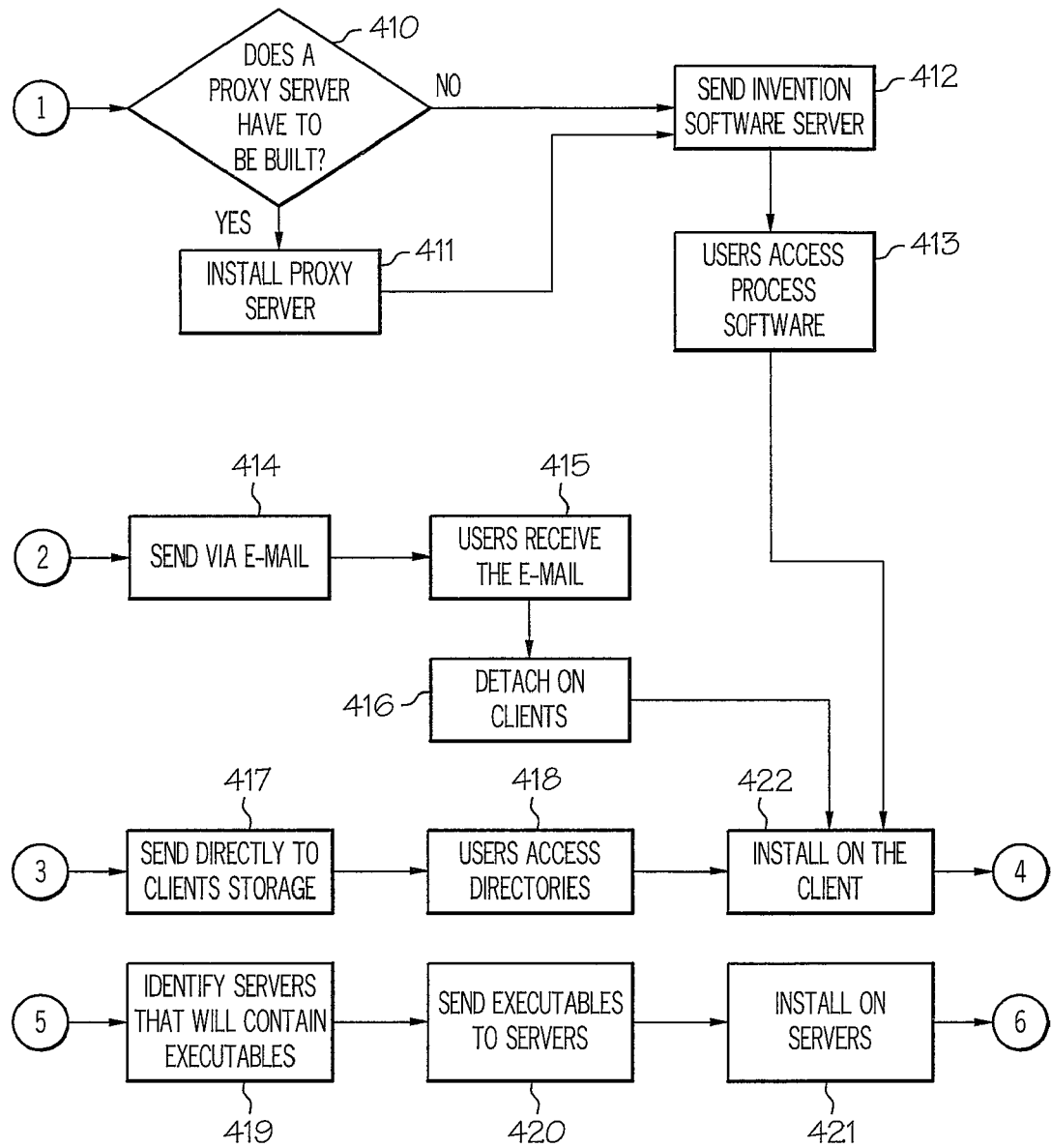

Referring then to FIG. 4, step 400 begins the deployment of the process software. The first thing is to determine if there are any programs that will reside on a server or servers when the process software is executed (query block 401). If this is the case, then the servers that will contain the executables are identified (block 419). The process software for the server or servers is transferred directly to the servers' storage via File Transfer Protocol (FTP) or some other protocol or by copying though the use of a shared file system (block 420). The process software is then installed on the servers (block 421).

Next, a determination is made on whether the process software is be deployed by having users access the process software on a server or servers (query block 402). If the users are to access the process software on servers, then the server addresses that will store the process software are identified (block 403).

A determination is made if a proxy server is to be built (query block 410) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 411). The process software is sent to the servers either via a protocol such as FTP or it is copied directly from the source files to the server files via file sharing (block 412). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 413). Another embodiment is to have the servers automatically copy the process software to each client and then run the installation program for the process software at each client computer. The user executes the program that installs the process software on his client computer (block 422) then exits the process (terminator block 408).

In query step 404, a determination is made whether the process software is to be deployed by sending the process software to users via e-mail. The set of users where the process software will be deployed are identified together with the addresses of the user client computers (block 405). The process software is sent via e-mail to each of the users' client computers (block 414). The users then receive the e-mail (block 415) and then detach the process software from the e-mail to a directory on their client computers (block 416). The user executes the program that installs the process software on his client computer (block 422) then exits the process (terminator block 408).

Lastly a determination is made on whether to the process software will be sent directly to user directories on their client computers (query block 406). If so, the user directories are identified (block 407). The process software is transferred directly to the user's client computer directory (block 417). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 418). The user executes the program that installs the process software on his client computer (block 422) and then exits the process (terminator block 408).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 5A:
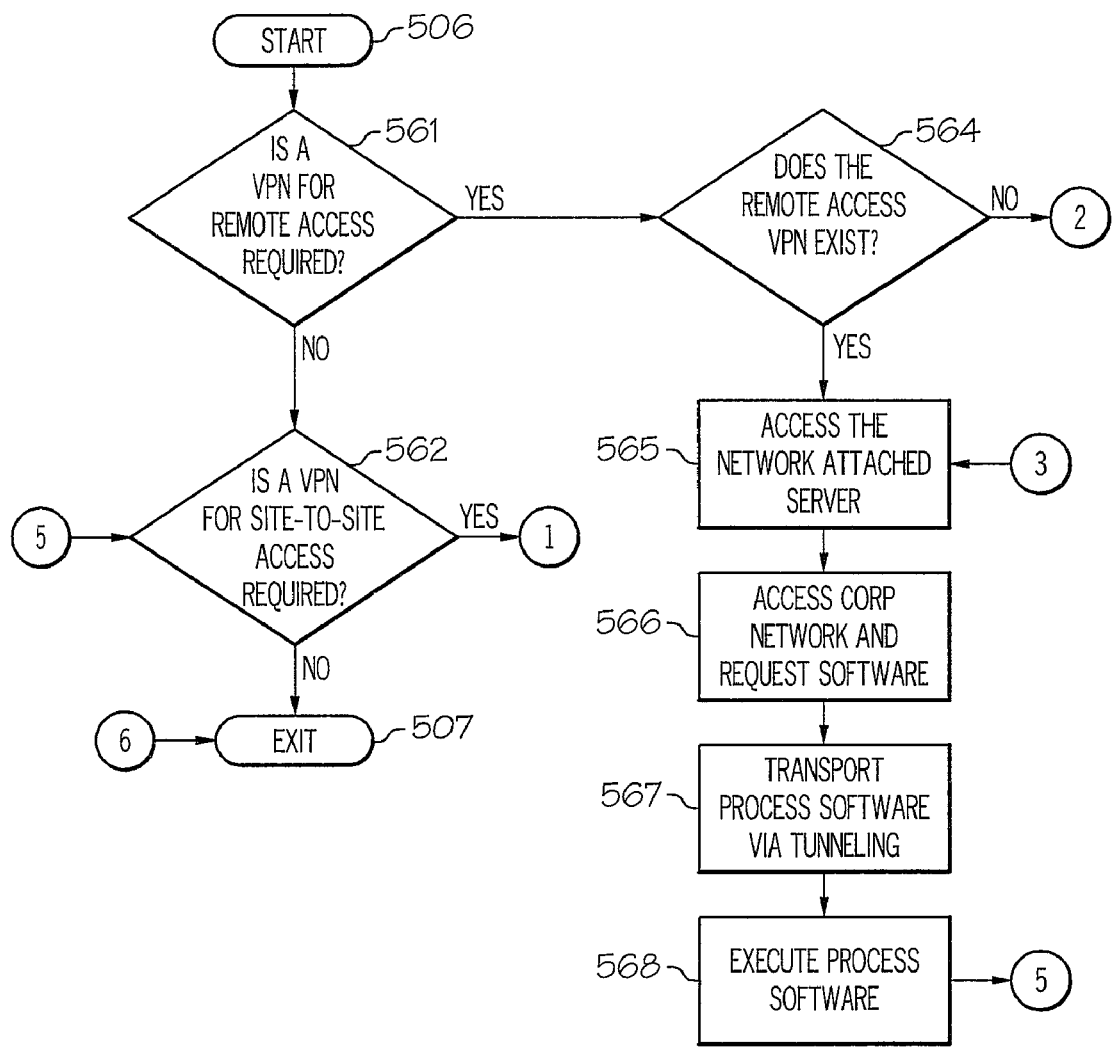
FIGS. 5A-B show a flow-chart of steps taken to deploy in a Virtual Private Network (VPN) software that is capable of executing the steps shown and described in FIGS. 3A-3C.
Figure 5B:
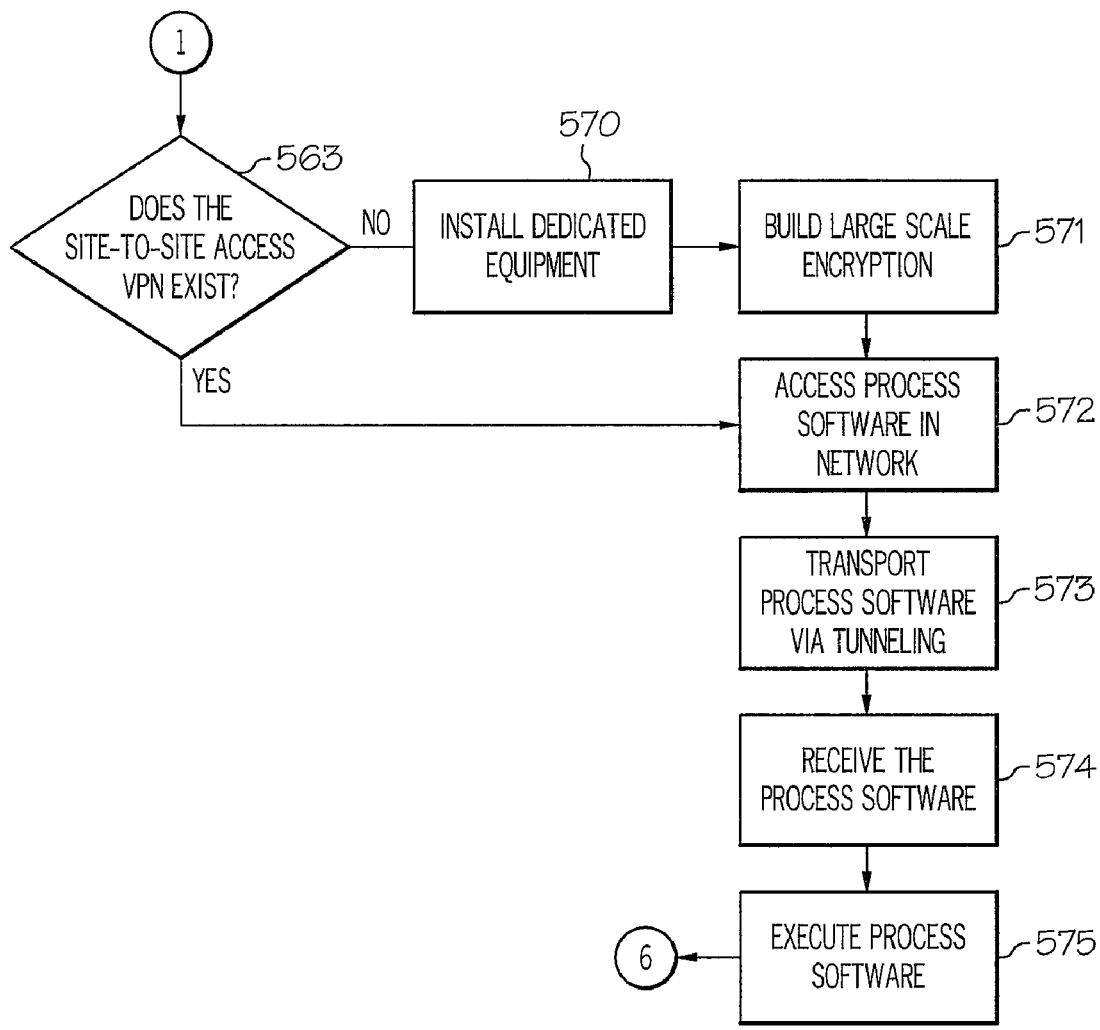
Figure 5C:
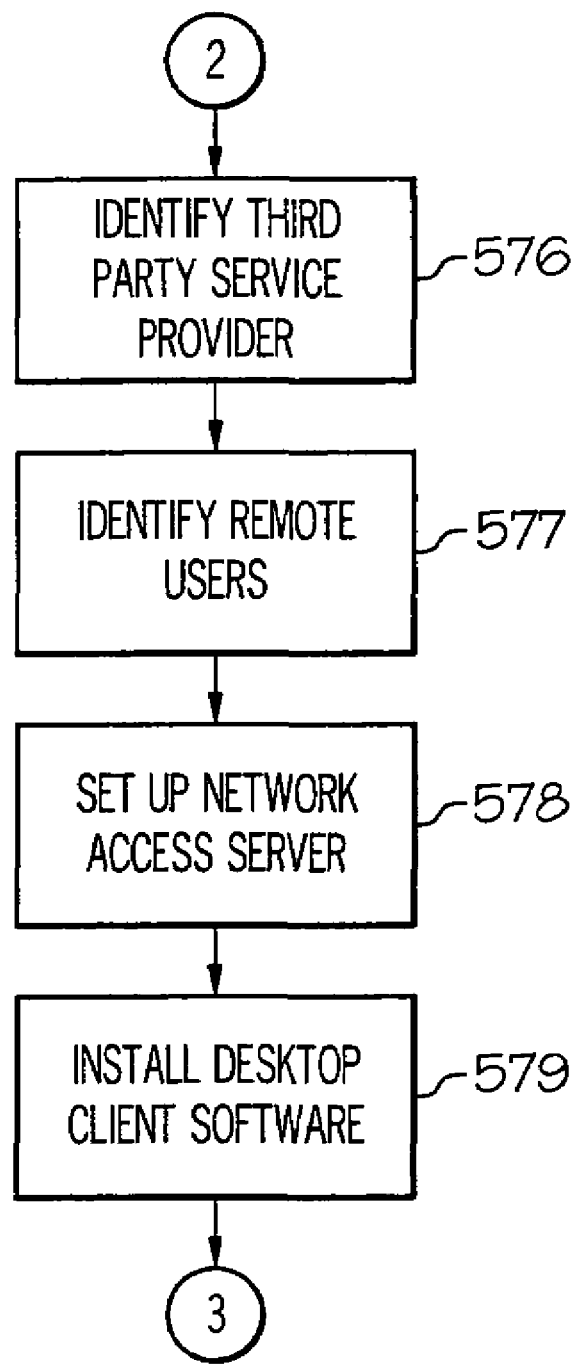

The process for such VPN deployment is described in FIG. 5A-C. Initiator block 506 begins the Virtual Private Network (VPN) process. A determination is made to see if a VPN for remote access is required (query block 561). If it is not required, then proceed to (query block 562). If it is required, then determine if the remote access VPN exists (query block 564).

If a VPN does exist, then proceed to block 565. Otherwise, as illustrated in FIG. 5C, identify a third party provider that will provide the secure, encrypted connections between the company's private network and the company's remote users (block 576). The company's remote users are identified (block 577). The third party provider then sets up a network access server (NAS) (block 578) that allows the remote users to dial a toll free number or attach directly via a broadband modem to access, download and install the desktop client software for the remote-access VPN (block 579).

After the remote access VPN has been built or if it been previously installed, the remote users can access the process software by dialing into the NAS or attaching directly via a cable or DSL modem into the NAS (block 565). This allows entry into the corporate network where the process software is accessed (block 566). The process software is transported to the remote user's desktop over the network via tunneling (block 567). That is, the process software is divided into packets and each packet including the data and protocol is placed within another packet (block 567). When the process software arrives at the remote user's desk-top, it is removed from the packets, reconstituted and then is executed on the remote users desk-top (block 568).

A determination is then made to see if a VPN for site to-site access is required (query block 562). If it is not required, then the process terminates (terminator block 507). Otherwise, a determination is made if the site to-site VPN exists (query block 563. If it does not exist, then the dedicated equipment required to establish a site to-site VPN is installed (block 570). Then the large scale encryption is built into the VPN (block 571).

After the site to site VPN has been built or if it had been previously established, the users access the process software via the VPN (block 572). The process software is transported to the site users over the network via tunneling (block 573). That is the process software is divided into packets and each packet including the data and protocol is placed within another packet (block 574). When the process software arrives at the remote user's desktop, it is removed from the packets, reconstituted and is executed on the site users desktop (block 575). The process then ends at terminator block 507.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6A:
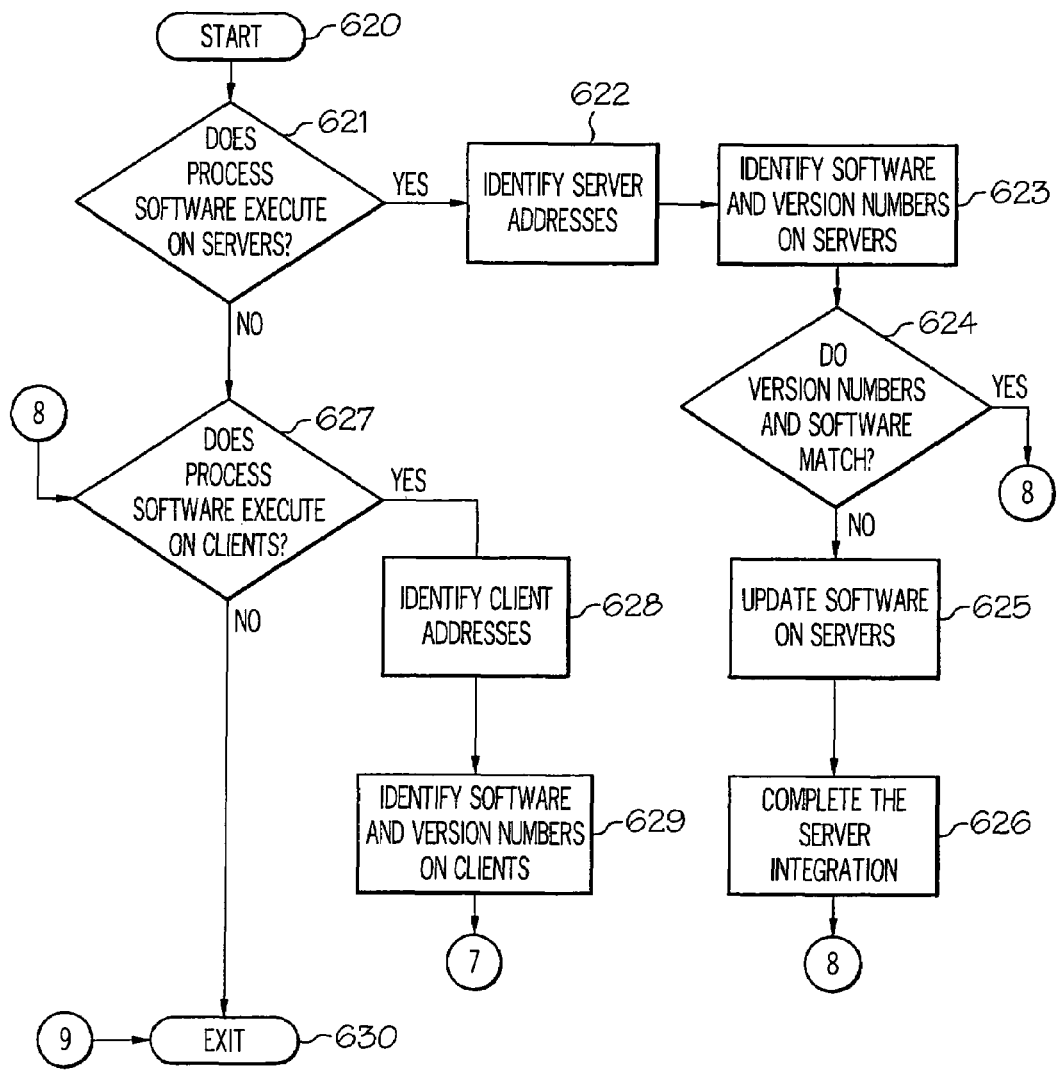
FIGS. 6A-B show a flow-chart showing steps taken to integrate into a computer system software that is capable of executing the steps shown and described in FIGS. 3A-3C.
Figure 6B:
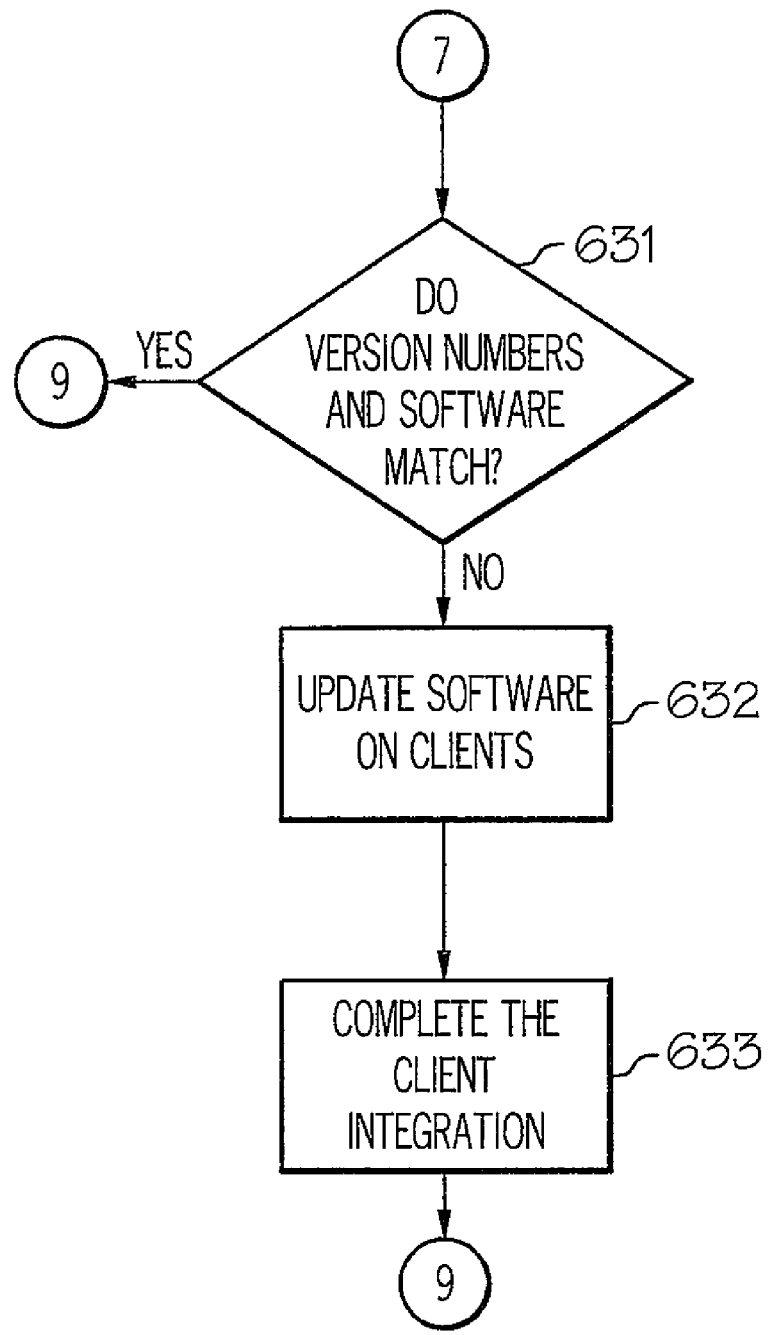

For a high-level description of this process, reference is now made to FIGS. 6A-B. Initiator block 620 begins the integration of the process software. A first determination is made whether there are any process software programs that will execute on a server or servers (block 621). If this is not the case, then integration proceeds to query block 627. If this is the case, then the server addresses are identified (block 622). The servers are checked to see if they contain software that includes the operating system (OS), applications, and network operating systems (NOS), together with their version numbers, which have been tested with the process software (block 623). The servers are also checked to determine if there is any missing software that is required by the process software.

A determination is made if the version numbers match the version numbers of OS, applications and NOS that have been tested with the process software (block 624). If all of the versions match and there is no missing required software the integration continues in query block 627.

If one or more of the version numbers do not match, then the unmatched versions are updated on the server or servers with the correct versions (block 625). Additionally, if there is missing required software, then it is updated on the server or servers. The server integration is completed by installing the process software (block 626).

The step shown in query block 627, which follows either the steps shown in block 621, 624 or 626 determines if there are any programs of the process software that will execute on the clients. If no process software programs execute on the clients the integration proceeds to terminator block 630 and exits. If this not the case, then the client addresses are identified as shown in block 628.

The clients are checked to see if they contain software that includes the operating system (OS), applications, and network operating systems (NOS), together with their version numbers, which have been tested with the process software (block 629). The clients are also checked to determine if there is any missing software that is required by the process.

A determination is made is the version numbers match the version numbers of OS, applications and NOS that have been tested with the process software (query block 631). If all of the versions match and there is no missing required software, then the integration proceeds to terminator block 630 and exits.

If one or more of the version numbers do not match, then the unmatched versions are updated on the clients with the correct versions (block 632). In addition, if there is missing required software then it is updated on the clients. The client integration is completed by installing the process software on the clients (block 633). The integration proceeds to terminator block 630 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
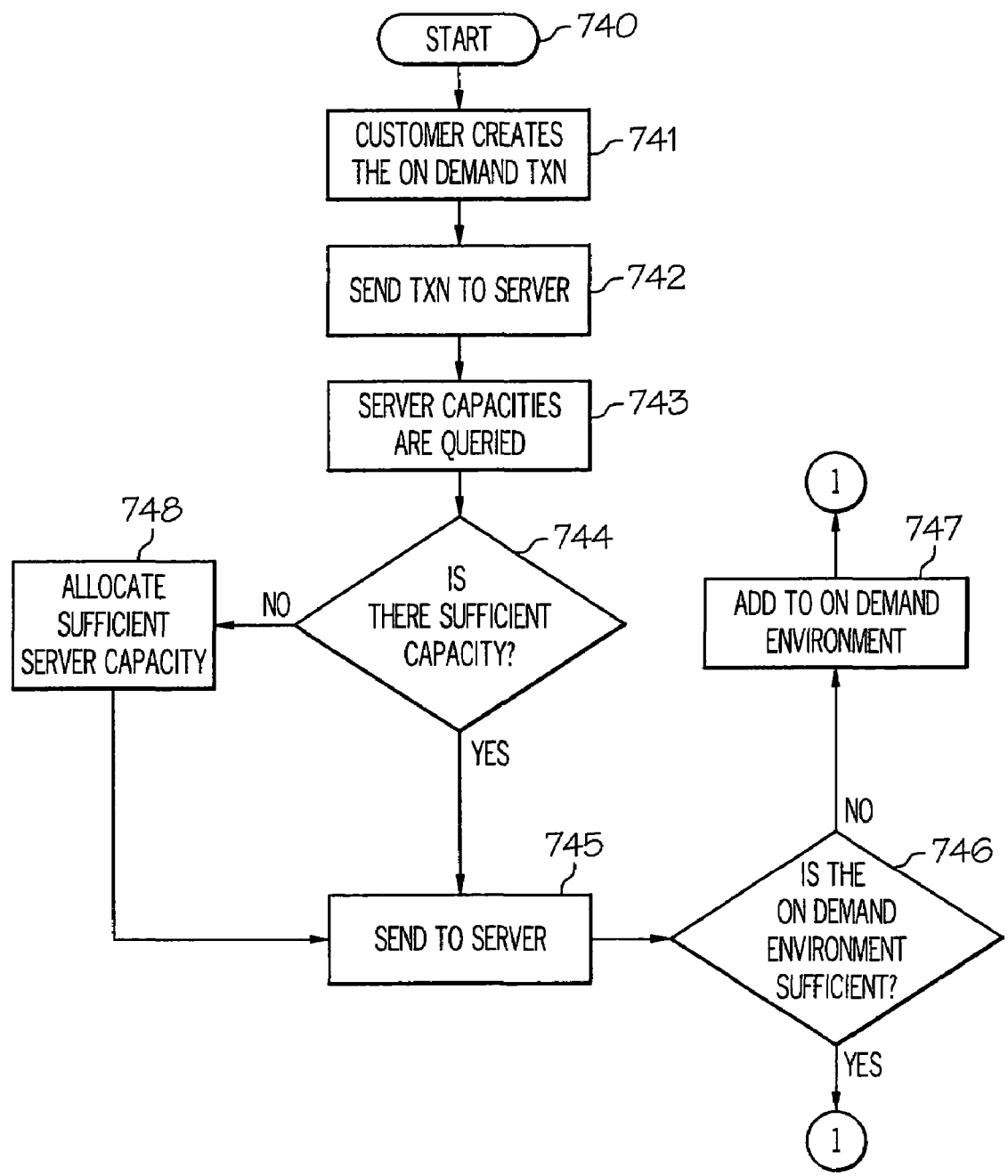
FIGS. 7A-B show a flow-chart showing steps taken to execute the steps shown and described in FIGS. 3A-3C using an on-demand service provider.

With reference now to FIG. 7A, initiator block 740 begins the On Demand process. A transaction is created than contains the unique customer identification, the requested service type and any service parameters that further, specify the type of service (block 741). The transaction is then sent to the main server (block 742). In an On Demand environment the main server can initially be the only server, then as capacity is consumed other servers are added to the On Demand environment.

The server central processing unit (CPU) capacities in the On Demand environment are queried (block 743). The CPU requirement of the transaction is estimated, then the servers available CPU capacity in the On Demand environment are compared to the transaction CPU requirement to see if there is sufficient CPU available capacity in any server to process the transaction (query block 744). If there is not sufficient server CPU available capacity, then additional server CPU capacity is allocated to process the transaction (block 748). If there was already sufficient Available CPU capacity then the transaction is sent to a selected server (block 745).

Figure 7B:
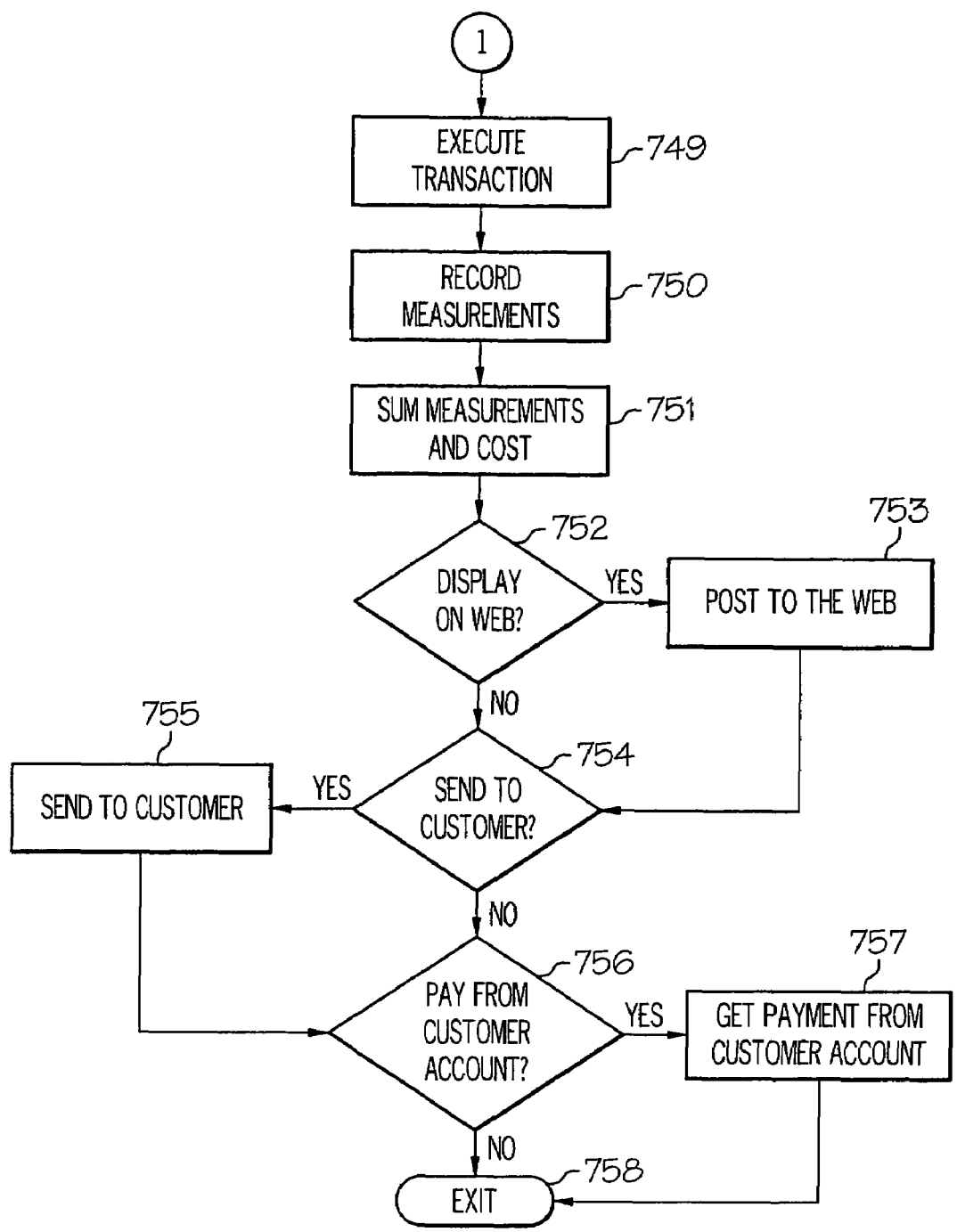

Before executing the transaction, a check is made of the remaining On Demand environment to determine if the environment has sufficient available capacity for processing the transaction. This environment capacity consists of such things as but not limited to network bandwidth, processor memory, storage etc. (block 746). If there is not sufficient available capacity, then capacity will be added to the On Demand environment (block 747). Next, as illustrated in FIG. 7B, the required software to process the transaction is accessed, loaded into memory, then the transaction is executed (block 749).

The usage measurements are recorded (block 750). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 751).

If the customer has requested that the On Demand costs be posted to a web site (query block 752), then they are posted (block 753). If the customer has requested that the On Demand costs be sent via e-mail to a customer address (query block 754), then these costs are sent to the customer (block 755). If the customer has requested that the On Demand costs be paid directly from a customer account (query block 756), then payment is received directly from the customer account (block 757). The On Demand process is then exited at terminator block 758.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

What is claimed is:

1. A computer-implementable method comprising:
   receiving a user input to activate a clip utility within an open window;
   enabling a selection of a particular portion of the open application window using a visible selection feature of the clip utility, wherein said particular portion is less than a total area of the open application window;
   on receipt of a request to clip the selected, particular portion, dynamically clipping said particular portion from the remainder of the application window and displaying only the clipped, particular portion of the application window as a separate window clip; and
   when a first separate window clip with a first aggregation indicator is brought within a pre-determined perimeter of a second window clip having a second aggregator indicator, automatically merging the first and second window clips into an aggregate portion and enabling functional use of components within the aggregate portion similar to the functional use of the individual first and second window clips, when within their respective open window.

2. The method of claim 1, further comprising:

when said open application window occupies a first viewable area within a display device, and said clipped particular portion occupies a second, smaller viewable area of the display device, said displaying the clipped, particular portion of the application window as a separate window clip displays the clipped, particular portion in only the second, smaller viewable area;

wherein portions of a second application having an application window opened behind remainder portions of the open application window are displayed when portions of the open application window are clipped away.

3. The method of claim 1, further comprising:

receiving a user selection of more than a single portion of the open window to clip; and said dynamically clipping process includes automatically/simultaneously clipping each of the more than a single portion of the open window; and tagging each window clip of the more than a single portion with an aggregation indicator;

wherein each window clip with an aggregation indicator is capable of being functionally linked to another window clip to create a larger aggregate portion.

4. The method of claim 1, further comprising:

enabling de-aggregation of an aggregate portion into its respective window clips;

wherein, responsive to receipt of a de-aggregation input, said method comprises:

separating the aggregate portion into the individual window clips aggregated during a prior merge operation; and dispersing the individual clip portions relative to each other such that each clip portion is displayed as a separate clip portion on the display screen.

5. The method of claim 1, further comprising:

providing a clip menu tool within a menu of the operating system's windowing function;

when the clip menu tool is selected by a user while an application is displaying the open window, visually indicating an outline of the portion of the window that is currently selected for clipping; and enabling reconfiguring of the portion of the window selected for clipping; and responsive to said reconfiguring, moving the outline to visually indicate the portion currently selected.

6. A system comprising:

a processor;

a data bus coupled to the processor;

a memory coupled to the data bus; and a computer-usable medium embodying computer program code, the computer program code comprising instructions executable by the processor and configured to:

receive a user input to activate a clip utility within an open window;

enable a selection of a particular portion of the open application window using a visible selection feature of the clip utility, wherein said particular portion is less than a total area of the open application window;

on receipt of a request to clip the selected, particular portion, dynamically clip said particular portion from the remainder of the application window and display only the clipped, particular portion of the application window as a separate window clip; and when a first window clip with an aggregation indicator is brought within a pre-determined perimeter of a second window clip with an aggregator indicator, automatically merge the first and second window clips into an aggregate portion and enable functional use of components within the aggregate portion similar to the functional use of the individual first and second window clips when within their respective open window.

7. The system of claim 6, wherein the instructions are further configured to:

when said open application window occupies a first viewable area within a display device, and said clipped particular portion occupies a second, smaller viewable area of the display device, said displaying the clipped, particular portion of the application window as a separate window clip displays the clipped, particular portion in only the second, smaller viewable area; wherein portions of a second application having an application window opened behind remainder portions of the open application window are displayed when portions of the open application window are clipped away.

8. The system of claim 6, wherein the instructions are further configured to:

receive a user selection of more than a single portion of the open window to clip; and said instructions configured to dynamically clip includes instructions to:

automatically/simultaneously clip each of the more than a single portion of the open window; and tag each window clip of the more than a single portion with an aggregation indicator;

wherein each window clip with an aggregation indicator is capable of being functionally linked to another window clip to create a larger aggregate portion.

9. The system of claim 1, wherein the instructions are further configured to:

enable de-aggregation of an aggregate portion into its respective window clips;

wherein, responsive to receipt of a de-aggregation input, the instructions are further configured to:

separate the aggregate portion into the individual window clips aggregated during a prior merge operation; and disperse the individual clip portions relative to each other such that each clip portion is displayed as a separate clip portion on the display screen.

10. The system of claim 6, wherein the instructions are further configured to:

provide a clip menu tool within a menu of the operating system's windowing function;

when the clip menu tool is selected by a user while an application is displaying the open window, visually indicate an outline of the portion of the window that is currently selected for clipping; and enable reconfiguring of the portion of the window selected for clipping; and responsive to said reconfiguring, move the outline to visually indicate the portion currently selected.

11. A computer-usable recordable medium embodying computer program code, the computer program code comprising computer executable instructions configured to:

receive a user input to activate a clip utility within an open window;

enable a selection of a particular portion of the open application window using a visible selection feature of the clip utility, wherein said particular portion is less than a total area of the open application window;

on receipt of a request to clip the selected, particular portion, dynamically clip said particular portion from the remainder of the application window and display only the clipped, particular portion of the application window as a separate window clip; and when a first window clip with an aggregation indicator is pulled within a pre-determined perimeter of a second clipped portion with an aggregator indicator, the embodied computer program code further comprises computer executable instructions configured to automatically merge the first and second window clips into an aggregate portion and enable functional use of components within the aggregate portion similar to the functional use of the individual first and second window clips when within their respective open window.

12. The computer-usable recordable medium of claim 11, wherein the embodied computer program code further comprises computer executable instructions configured to:

when said open application window occupies a first viewable area within a display device, and said clipped particular portion occupies a second, smaller viewable area of the display device, said displaying the clipped, particular portion of the application window as a separate window clip displays the clipped, particular portion in only the second, smaller viewable area; wherein portions of a second application having an application window opened behind remainder portions of the open application window are displayed when the portions of the open application window are clipped away.

13. The computer-usable recordable medium of claim 11, wherein the embodied computer program code further comprises computer executable instructions configured to:

receive a user selection of more than a single portion of the open window to clip; and said instructions configured to dynamically clip includes instructions to:

automatically/simultaneously clip each of the more than a single portion of the open window; and tag each window clip of the more than a single portion with an aggregation indicator;

wherein each window clip with an aggregation indicator is capable of being functionally linked to another window clip to create a larger aggregate portion.

14. The computer-usable recordable medium of claim 11, wherein the embodied computer program code further comprises computer executable instructions configured to:

enable de-aggregation of an aggregate portion into its respective window clips;

wherein, responsive to receipt of a de-aggregation input, the instructions are further configured to:

separate the aggregate portion into the individual window clips aggregated during a prior merge operation; and disperse the individual clip portions relative to each other such that each clip portion is displayed as a separate clip portion on the display screen.

15. The computer-usable recordable medium of claim 11, wherein the embodied computer program code further comprises computer executable instructions configured to:

provide a clip menu tool within a menu of the operating system's windowing function;

when the clip menu tool is selected by a user while an application is displaying the open window, visually indicate an outline of the portion of the window that is currently selected for clipping; and enable reconfiguring of the portion of the window selected for clipping; and responsive to said reconfiguring, move the outline to visually indicate the portion currently selected.

16. The computer-useable recordable medium of claim 11, wherein the computer executable instructions are deployable to a client computer from a server at a remote location.

17. The computer-useable recordable medium of claim 11, wherein the computer executable instructions are provided by a service provider to a customer on an on-demand basis.

* * * * *